United States Patent
Kjolseth et al.

(10) Patent No.: US 8,007,012 B2
(45) Date of Patent: Aug. 30, 2011

(54) COUPLING

(75) Inventors: Trygve Kjolseth, Oslo (NO); Bjørn Melve, Trondheim (NO)

(73) Assignee: Mirador AS, Oslo (NO)

(*) Notice: Subject to any disclaimer, the term of this patent is extended or adjusted under 35 U.S.C. 154(b) by 0 days.

(21) Appl. No.: 12/513,014

(22) PCT Filed: Oct. 30, 2007

(86) PCT No.: PCT/NO2007/000384
§ 371 (c)(1), (2), (4) Date: Aug. 17, 2009

(87) PCT Pub. No.: WO2008/054227
PCT Pub. Date: May 8, 2008

(65) Prior Publication Data
US 2010/0072741 A1    Mar. 25, 2010

(30) Foreign Application Priority Data
Nov. 2, 2006 (NO) .................... 20065028

(51) Int. Cl.
*F16L 47/00* (2006.01)

(52) U.S. Cl. .................... 285/296.1; 285/919
(58) Field of Classification Search ............ 285/296.1, 285/919
See application file for complete search history.

(56) References Cited

U.S. PATENT DOCUMENTS

| | | | | |
|---|---|---|---|---|
| 344,760 A * | 6/1886 | Wilbur | ........ | 285/296.1 |
| 693,830 A * | 2/1902 | Burke | ........ | 285/296.1 |
| 868,349 A * | 10/1907 | Lomax | ........ | 285/296.1 |
| 1,895,426 A * | 1/1933 | Young et al. | ........ | 285/296.1 |
| 3,606,401 A * | 9/1971 | Schwartz | ........ | 285/296.1 |
| 3,847,694 A * | 11/1974 | Stewing | ........ | 285/296.1 |
| 3,916,502 A * | 11/1975 | Bagnulo | ........ | 285/294.3 |
| 4,647,080 A * | 3/1987 | Sandt et al. | ........ | 285/296.1 |
| 5,685,577 A * | 11/1997 | Vanesky | ........ | 285/296.1 |
| 7,014,219 B2 * | 3/2006 | Hoppenz et al. | ........ | 285/296.1 |

FOREIGN PATENT DOCUMENTS
FR     2 248 134 A    5/1975
WO    WO 95/02144 A   1/1995

* cited by examiner

*Primary Examiner* — David E Bochna
(74) *Attorney, Agent, or Firm* — Frommer Lawrence & Haug LLP; Ronald R. Santucci

(57) ABSTRACT

Coupling, comprising a first part (1) in the form of a male part and a second part (2) in the form of a female part, the male part can be brought into the female part and thereby form a ring shaped void (3) between the facing surfaces of male and female parts, which ring shaped void in the axial direction of the parts are delimited with an inner restriction (4) at an inner side and an outer restriction (5) at an outer side, and a feed-through (6) is arranged from the outer surface of the female part to the void (3), for injection of glue into the void, and a feed-through (7) is arranged from the void to the outer surface of the female part, for venting and leakage of glue when filling the void with glue, distinguished in that the feed-through (7) for venting and leakage of glue is arranged closer to the outer side of the void than the feed-through (6) for injection of glue.

6 Claims, 3 Drawing Sheets

COUPLING

This is a 371 filing of International Patent Application No. PCT/NO2007/000384 filed Oct. 30, 2007 and published on May 8, 2008 under publication number WO 2008/054227 A and claims priority benefits to Norwegian Patent Application Number 2006 5028 filed Nov. 2, 2006, the disclosure of which is hereby incorporated by reference.

FIELD OF THE INVENTION

The present invention relates to a coupling between a first part in the form of a male part and a second part in the form of a female part, which parts are joined permanently by gluing. The parts are preferably in the form of pipe parts or fittings.

BACKGROUND OF THE INVENTION AND PRIOR ART

Gluing is used particularly for joining parts of non-weldable materials, such as reinforced termoset polymer material, for example pipes and pipe parts of fibre-reinforced polymers, FRP.

In patent publication NO 311272 a glued joint and a joining method are is described. More specifically, a joint is formed by gluing together two objects of which at least one comprises a pipe formed joining section that can be thread or brought over the other object, distinguished in that a delimited void is formed between the object and the pipe formed joining section of the first object, and that a first bore extends from the external face of the pipe formed joining section to said void, through which first void glue can be pressed into the void. Said publication further contains description on forming a joint in agreement with the above, by gluing together two objects, of which at least one are pipe shaped or pipe formed in the area at the joining section and arranged to be thread over the other object by use of said section, distinguished by closing an opening formed between the pipe formed joining section and the other object when the pipe formed section is brought over said object, to create a delimited void or space between the objects, and by pressing glue through a first bore formed in the pipe formed joining section in the purpose of filling the void with glue.

The glue joint of NO 311272 has proved to very successful, and it finds use particularly in pipe systems of relatively moderate dimensions, such as pneumatic systems, sprinkler systems, cooling systems, systems for mild chemicals, draining, waste and cleaning. For such pipe systems the labour of installation amounts to about 80% of the costs, while the component costs only amounts to about 20%. It has turned out that pipe systems with glued joints according to NO 311272 can cut the costs of installation in half, because the installation is substantially simplified. The pipes that are used are particularly made of glass fibre and vinyl ester, the coupling parts are typically made of phenol resins and glass fibre, while the glue typically is of the epoxy type, for example a type of Araldite.

However, one embodiment of the glued joint of NO 311272 requires particular attention to ensure the aimed quality. Said embodiment is illustrated on FIG. 3 (corresponds to FIG. 2 of NO 311272), comprising two venting or relieving bores or holes 14, of which one venting bore is near the inner side of the void and one venting bore is near the outer side of the void. With an inner side it is here meant further into the joint, which means the side of the void closest to the end of the male part 9. By installation a glue gun is brought towards the bore 13, glue is injected into the void 10 and filling it completely, after which the glue by further injection will leak out of the venting holes 14. It has turned out that by installation it must particularly be observed that glue seeps out to substantial extent from both venting holes, and in particular the inner venting hole. If glue is not filled up well also to the inner venting hole, there can be a possible leakage way for fluid within the pipe system with glued joints in agreement with FIG. 2 of the patent publication NO 311272. This is because fluid under pressure in the pipe system will follow the interface between the pipe parts 9 and 8, and if the fluid has sufficient pressure it can extend through the seal 11 and reach the inner venting hole 14. On FIG. 3 the leakage way is indicated with an arrow L. There is a demand for a coupling which is completely safe with respect to the above mentioned problem, and the objective of the present invention is to provide such a coupling.

SUMMARY OF THE INVENTION

With the present invention a coupling is provided, comprising a first part in the form of a male part and a second part in the form of a female part, the male part can be brought into the female part and thereby form a ring shaped void in the interface between the male and female part, which ring shaped void in the axial direction of the parts are delimited by an inner limitation at an inner side and an outer limitation at an outer side, and a feed-through is arranged from the outer surface of the female part to the void, for injection of glue into the void, and a feed-through is arranged from the void to the outer surface of the female part, for venting and leaking out glue when filling the void with glue. The coupling is distinguished in that the feed-through for venting and leaking of glue is arranged closer to the outer side of the void than the feed-through for injection of glue.

With an inner side it is meant the side along the longitudinal axis of the male part further into the opening of the female part. With delimitations it is meant packers or seals, or that the void ends or abuts blindly against a wall. With male part and female parts it is meant two parts shaped or formed so that the male part can be brought into a complementary shaped opening in the female part, with adapted difference in dimension, so that the joining easily can be made. The dimensional difference between the outer diameter of the male part or width and the female part's opening is typically 0.15 mm or larger, and delimitations in the form of packers or seals can be adapted to make possible a relatively large dimensional difference. The male part and the opening of the female part that are joined preferably have a circular cross section, but not necessarily, as the cross section can have almost any shape. With the feed-through for venting and leakage of glue being arranged closer to the outer side of the void than the feed-through for injection of glue, it is meant that the fluid connection to the void for venting and leaking of glue is closer to the receiving opening of the female part than the feed-through for injection of glue. Preferably one feed-through for injection of glue is arranged and one feed-through for venting and leakage of glue. However, there can be more than one feed-through for venting and leakage of glue, of which all have to be arranged closer to said outer side than the feed-through for the injection of glue.

In a preferable embodiment the ring shaped void is asymmetrical with respect to the cross section, such that it has larger height toward the inner side than the outer side. With height it is meant the dimension radial from the longitudinal axis of the male part, such that a larger height provides larger void space and larger cross section area for flow of glue in the void space.

The void can be formed directly as a result of dimensional difference between the male part and the female part, but is most preferably formed in the form of grooves in the male part, female part or both parts. Most preferably grooves are arranged for void in the female part, because the female part usually will be a coupling part that thereby will fit for joining with a cut pipe end of corresponding dimension.

The feed-throughs for injection of glue and venting and leakage of glue are preferably arranged diametrically opposite around the circumference, to ensure that glue that fills the void arrive the feed-through for venting and leakage only when the full void has been filled with glue.

The delimitations are preferably in the form of packers, preferably O-rings, but can also be in the form of packers or seals equipped with springs and packers having different cross section than a circular cross section.

The male part is preferably a FRP-pipe and the female part is preferably a FRP-pipe coupling part (FRP-socket).

FIGURES

The present invention, and the underlying problem for it, are illustrated with three figures, of which:

DETAILED DESCRIPTION

Figure 1:
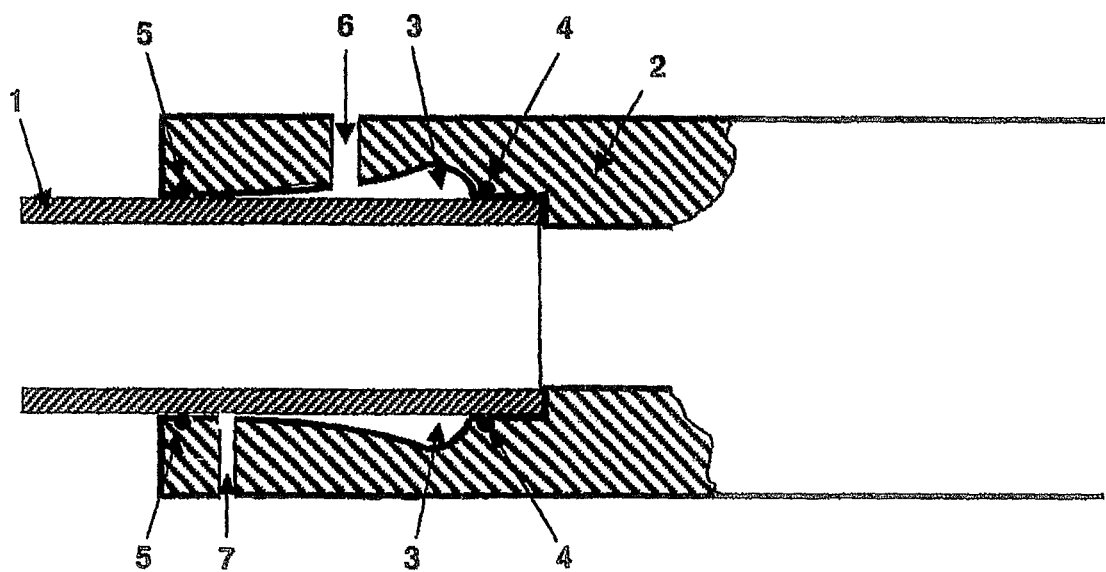
FIG. 1 illustrates a coupling according to the invention.

Reference is first made to FIG. 1 that illustrates a coupling according to the invention. The coupling comprises a first part 1 in the form of a male part and a second part 2 in the form of a female part, the male part can be brought into the female part and thereby a ring shaped void 3 is formed in the interface between male and female parts. The ring shaped void is in the axial direction of the male and female parts delimited with an inner limitation 4 at the inner side and an outer limitation 5 at the outer side. Further, a feed-through 6 is arranged from the outer surface of the female part to the void 3, for injection of glue into the void, and a feed-through 7 for venting and leakage of glue when filling the void with glue, is arranged. It appears clearly from the figure that the feed-through 7 for the venting and leaking of glue is arranged closer to the outer side than the feed-through 6 for injection of glue. With the outer side it is meant closer to the opening of the female part, where the male part enters.

It appears clearly on FIG. 1 that the ring shaped void has larger height towards the inner side than the outer side, as the void is asymmetrically shaped.

Figure 2A:
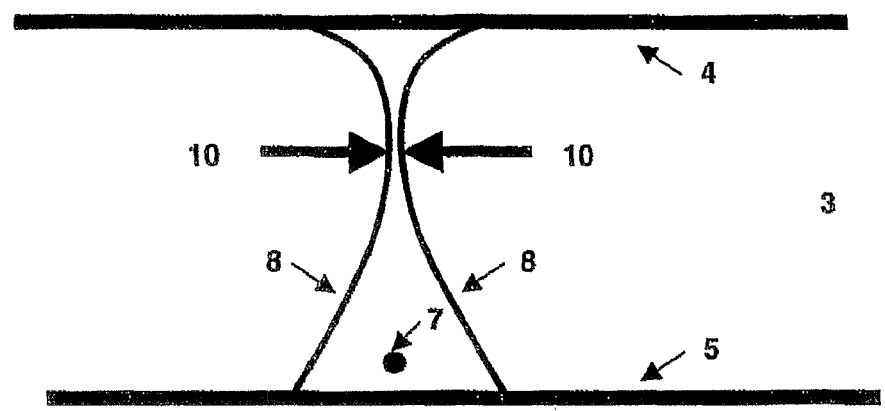
FIGS. 2a and 2b illustrate filling with glue the void of the coupling according to the invention.
Figure 2B:
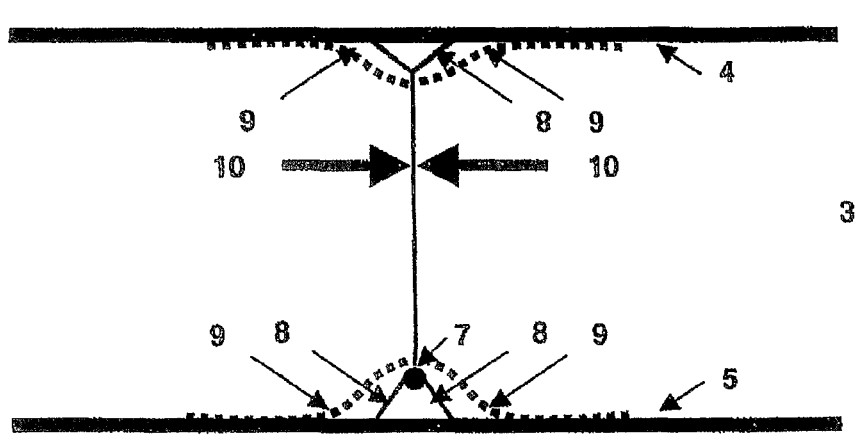

Further, reference is made to the FIGS. 2a and 2b, illustrating the advantage of the present invention in further detail. More specifically, two illustrations of the ring shaped void 3 can be seen, both viewed parallel with the axis of the feed-through 7 on FIG. 1. The figures illustrate gluing of a coupling according to the invention, which means filling of the void 3 with glue to glue together the male and female parts. The venting feed-through or hole 7 goes straight into the figure paper for both illustrations. The ring shaped void 3 is in FIG. 2a almost completely filled with glue by injecting with a glue gun or similar through the feed-through 6 (not shown on FIG. 2a). The glue front moving around the ring shaped void and filling it, is illustrated at 8, while the direction of the movement is illustrated with the arrows 10. The void space has only one venting feed-through 7. The geometry of the glue seam or joint is asymmetrical, such that the glue joint is deeper at one side and the glue front moves faster and meets first on said side, where the height of the ring shaped void is larger, which is at the inner side of the ring shaped void 3. This is the side against the packer or limitation 4. The glue flows asymmetrically because the resistance against flow is lower where the ring shaped void is higher. After a while the glue fronts meets, such that the ring shaped void becomes filled with glue and thereby a glue joint is formed, which is illustrated on FIG. 2b. However, it may turn out that one or two small areas or volumes are not completely filled up, namely the volumes within the glue front 8 towards respectively the inner delimitation 4 and the outer delimitation 5. Said areas will thereby contain an air void, and after the pressure of the glue gun has been released a re-distribution of glue in the areas of air voids may take place, as the dotted lines 9 on FIG. 2b indicate. The formation of one or two air voids is due to the glue flowing further out from the venting feed-throughs in stead of filling the ring shaped void completely. A fluid under pressure in a pipe system with couplings according to the invention will act or press against the inner side of the glue joint, which means over the restriction or delimitation 4. But with the present invention there is no venting feed-through at the inner side, as venting feed-throughs are only arranged towards the outer side of the joint. This has two substantial advantages relative to the previously known coupling. First, there is no possible leakage way for fluid under pressure close to the pressurized side of the glued joint. Second, the particular arrangement of a venting feed-through 7, preferably one, there can be several, results in that the ring shaped void 3 will be filled up more completely, such that the glue forms a stronger seam or joint. With the present invention there is preferably only one venting feed-through, and this is preferably arranged as close the outer side of the ring shaped void as possible. Thereby a filling of the ring shaped void with glue is ensured to be as complete as possible, and the possible leakage way with a fluid under pressure is excluded.

Figure 3:
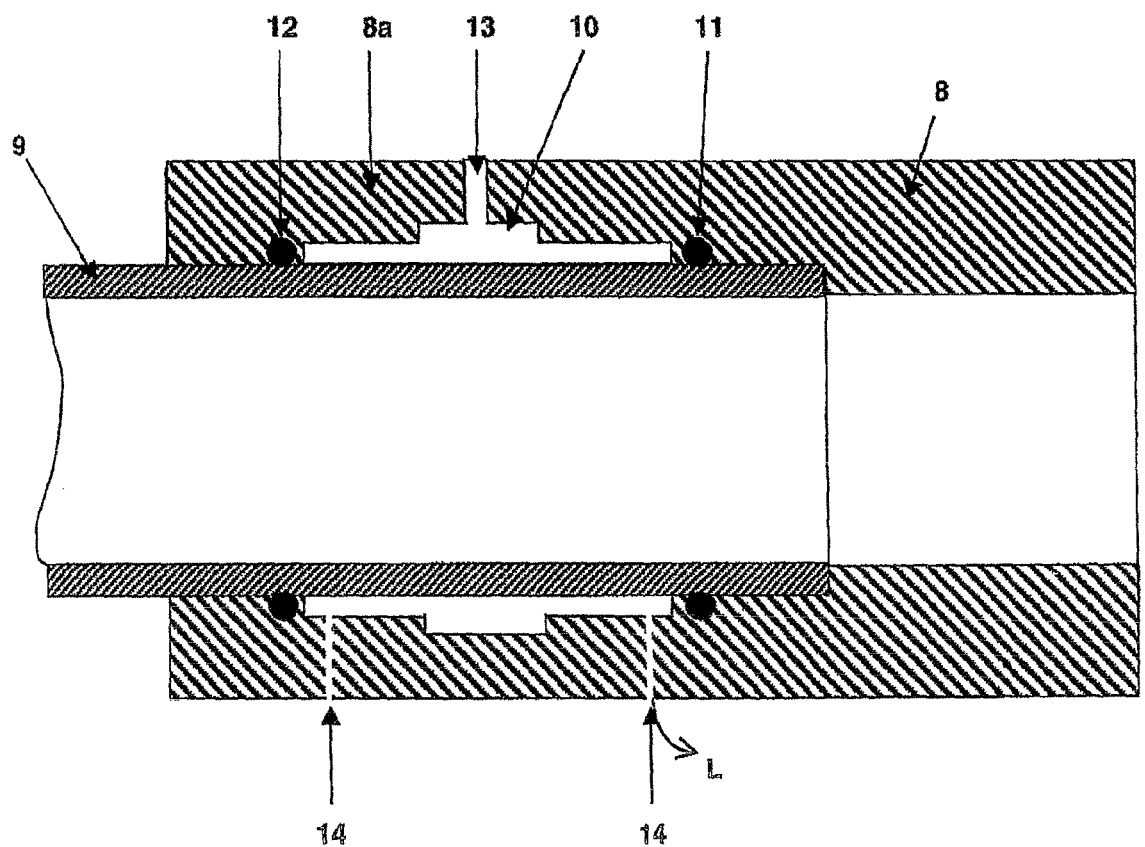
FIG. 3 is FIG. 2 of the Patent Publication NO 311272, and illustrates prior art and the underlying problem of the invention.

FIG. 3 is as previously mentioned corresponding to FIG. 2 of the previously described patent NO 311272, and illustrates prior art and the underlying problem of the invention. On FIG. 3 the venting feed-through 14 constitutes, on the right hand side of the figure and closest to the inner side of the ring shaped void and the glued joint facing possible fluid under pressure, a possible leakage way, which leakage way is indicated with arrow L.

The ring shaped void in a coupling according to the invention can in principle have any cross section, but is preferably asymmetrical, as illustrated on FIG. 1.

In a preferable embodiment the ring shaped void is shaped so that the cross section thereof has the form of at least three coinciding wave tops or wave shapes, for which glue injection takes place to the wave shape closest to the pressurized side, which means the inner end, and a venting feed-through is arranged from the wave shape closest to the outer side, diametrically opposite with respect to the circumference. For said embodiment the intermediate wave shape of the ring shaped void will with very large probability always be completely filled with glue before it starts leaking out of the venting feed-through, which ensures a preferable strong glued joint. The wave shapes can preferably have decreasing height against the outer side of the ring formed void, and a wave shaped groove can be arranged on the male part as well, which provides an even stronger joint and longer leakage way for fluid under pressure.

The invention is useful for joining parts of all types of material that can be glued together with an appropriate glue.

Which parts of the pipe and pipe parts that constitute the male and female parts, are interchangeable.

The invention claimed is:

1. Coupling, comprising
a first part in the form of a male part and
a second part in the form of a female part, such that when the male part is brought into the female part a ring shaped void is formed between the facing surfaces of male and female parts, which ring shaped void in the axial direction of the parts are delimited with an inner restriction at an inner side and an outer restriction at an outer side, and
a first feed-through is arranged from the outer surface of the female part to the void, for injection of glue into the void, and
a second feed-through is arranged from the void to the outer surface of the female part, for venting and leakage of glue when filling the void with glue,
wherein the void is shaped such that resistance to flow of glue introduced to the void through the first feed-through is lower in the ring shaped void that is towards the inner side of the first feed-through than in the ring shaped void that is towards the outer side of the first feed-through
wherein the feed-through for venting and leakage of glue is arranged closer to the outer side of the void than the feed-through for injection of glue, and wherein the ring shaped void is asymmetrically shaped, with larger height towards the inner side than the outer side.

2. Coupling according to claim 1, wherein the void is formed by a machined groove in the female part.

3. Coupling according to claim 1, wherein the feed-throughs are arranged diametrically opposite with respect to the circumference.

4. Coupling according to claim 1, wherein the restrictions are in the form of seals.

5. Coupling according to claim 1, wherein male part is a fiber-reinforced polymer pipe and the female part is a fiber-reinforced polymer pipe coupling part or socket.

6. The coupling of claim 1, wherein the ring shaped void has a larger void space and larger cross section area from the first feed-through toward the inner side than from the first feed-through toward the outer side.

* * * * *